United States Patent

Kaufman

[15] 3,635,311
[45] Jan. 18, 1972

[54] OIL SCOOP DUCT FOR ROTATABLE TROUGHED OIL PUMPING DRUM

[72] Inventor: Howard N. Kaufman, Monroeville, Pa.
[73] Assignee: Westinghouse Electric Corporation, Pittsburgh, Pa.
[22] Filed: Mar. 25, 1970
[21] Appl. No.: 22,565

[52] U.S. Cl. .......................... 184/11 A, 184/13 R, 308/127
[51] Int. Cl. .......................................................... F16n 7/16
[58] Field of Search ................... 184/11, 11 A, 13; 308/128, 308/245, 127

[56] References Cited

UNITED STATES PATENTS

| | | | |
|---|---|---|---|
| 2,943,517 | 7/1960 | Markley et al. | 184/11 X |
| 3,065,822 | 11/1962 | McAfee | 184/11 X |
| 3,476,452 | 11/1969 | Hagg et al. | 308/127 |
| 3,441,106 | 4/1969 | Taylor et al. | 184/11 X |
| 3,162,269 | 12/1964 | Reed | 184/13 X |
| 3,098,683 | 7/1963 | Jernberg | 308/245 X |
| 3,515,246 | 6/1970 | Haight et al. | 184/11 |

*Primary Examiner*—Manuel A. Antonakas
*Attorney*—F. H. Henson and F. E. Blake

[57] ABSTRACT

A scoop duct for a rotatable troughed oil pumping drum is comprised of a first curved scoop member extending at one end towards the top of the drum in close proximity and substantially tangent to the upper position of the internal floor surface of the trough of the drum in a direction against the direction of rotation of the drum and curved downwards to extend at its other end towards the axis of the drum. The duct further includes an oil distribution member having a surface curving from the other end of the scoop member to incline in the direction of the rotatable axis of the drum towards a bearing lubrication oil port. The mating surfaces at each end of the scoop duct are substantially tangent to the adjacent curved surfaces so that substantially continuous curved surfaces lead to and from the scoop and the oil is scooped and distributed from the drum with a minimum of agitation and aeration.

7 Claims, 4 Drawing Figures

PATENTED JAN 18 1972
3,635,311
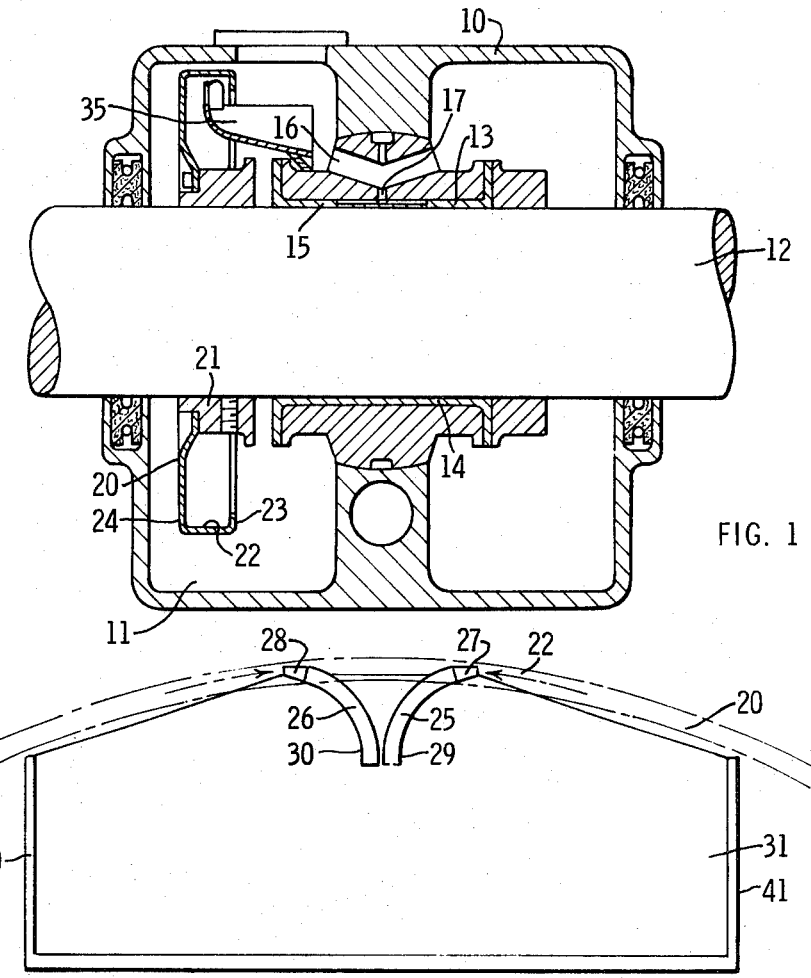
FIG. 1
FIG. 2
FIG. 3
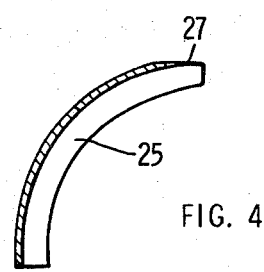
FIG. 4
WITNESSES
Helen M. Farkas
James F. Young
INVENTOR
HOWARD N. KAUFMAN
BY
Francis E. Blake
ATTORNEY

OIL SCOOP DUCT FOR ROTATABLE TROUGHED OIL PUMPING DRUM

CROSS-REFERENCES TO RELATED PATENT APPLICATIONS

So far as is known, this invention is not related to any copending U.S. patent applications.

BACKGROUND OF THE INVENTION

Self-lubricating bearings having rotatable oil-pumping drums for circulating the lubrication oil are well known and reference may be made to the U.S. Pat. No. 3,476,452 issued to Arthur C. Hagg and Joseph H. Hoffman on Nov. 4, 1969, for an example of such a bearing construction to which the oil scoop duct of this invention may be applied. It has been found that when the bearing to be lubricated is operating under conditions of high temperature and/or high rotational shaft speed, the lubricating oil, to be most effective, must be free of bubbles or aeration as may be caused when the oil is agitated. Therefore, a scoop duct for scooping and distributing the oil from a rotatable oil-pumping drum should feed the oil smoothly and without agitation or aeration into the bearing lubrication ports.

PRIOR ART

In addition to the aforementioned patent, the following listed U.S. patents show prior forms of scoop duct arrangements that however do not disclose the interrelated curved surfaces of the scoop duct and distributing member as provided in the manner of the present invention:

| | | |
|---|---|---|
| 1,921,339 | Bary | Aug. 8, 1933 |
| 155,747 | Overbagh | Oct. 6, 1874 |

SUMMARY

In accordance with the present invention, an oil scoop duct for a rotatable troughed oil-pumping drum is comprised of at least one curved scoop member and one curved oil-distributing member with the mating surfaces at one end of the scoop duct being substantially tangent to the adjacent internal floor surface of the trough drum in its upper position and the mating surfaces at the other end of the scoop being substantially tangent to the curved distributing surface. The scoop duct is curved to extend at said one end in a direction against the direction of rotation of the oil-pumping drum and curves downward at its other end to extend towards the axis of the drum. The oil-distributing member is curved to extend from the other end of the scoop duct to incline downwards in the direction of the axis of the drum towards suitable oil-distribution ports of the bearing to be lubricated in which is journaled the rotatable shaft on which the pumping drum is mounted for rotation therewith. In one embodiment of the invention, two curved scoop ducts that are respectively curved to extend in opposite directions are provided so that the oil pumping and distribution will be effective for either direction of rotation of the shaft and pumping drum.

Further details of the invention will be apparent with reference to the following specification and drawing.

BRIEF DESCRIPTION OF THE DRAWING

FIG. 1 is a sectional view of the bearing and scoop duct arrangement of the invention;

FIG. 2 is a fragmentary end elevational view of the scoop duct looking into the direction of the inclined oil distributing surface member towards the curved scoop ducts;

FIG. 3 is a side elevational view of FIG. 2; and

FIG. 4 is a detailed sectional view of one of the curved scoop ducts.

DESCRIPTION OF THE PREFERRED EMBODIMENTS

Referring to FIG. 1 of the drawings, a bearing for which the oil-pumping drum and scoop duct of the invention may be used will be briefly described. If a detailed understanding and description of the bearing shown in FIG. 1 is desired, reference should be made to the aforementioned U.S. Pat. No. 3,476,452. The bearing is shown to include a casing 10 having a sump 11 in which a quantity of oil is maintained at all times during operation of the bearing. A rotatable shaft 12 is journaled on sleeve bearing surfaces such as shown at 13–15 and oil is continuously pumped to be distributed through suitable bearing lubrication ports such as shown at 16 and 17 as will be obvious to those skilled in the art. The oil passing through the lubrication ports 16 and 17 is distributed to the requisite bearing surfaces and subsequently is drained through to accumulate in the sump 11 of the bearing casing 10.

In order to pump the oil from the sump 11 continuously as the shaft 12 rotates for distribution to the bearing lubrication ports such as the port 16, a rotatable oil-pumping drum 20 is secured by the hub 21 to the shaft 12 for rotation therewith. The pumping drum 20 is provided with a peripheral trough having an internal trough floor surface 22 together with trough sidewall surfaces 23 and 24. As the troughed pumping drum 20 is rotated, oil within the sump 11 is picked up by the internal trough floor surface 22 of the pumping drum and is carried therewith by centrifugal force and the natural tendency of the oil to cling to a surface as the pumping drum 20 rotates to bring the internal trough floor surface 22 from a lower position to an upper position. Assuming the shaft 12 to be rotating at sufficient speed, with the pumping drum 20 rotating therewith, a requisite quantity of oil will be picked up from the sump 11 and carried by the floor surface 22 to an upper position where it may be scooped off by the scoop duct 25 or 26 to be deposited on the inclined curved surface 31 of the oil-distributing member.

As shown more clearly by FIG. 2 of the drawing a curved scoop member 25 or 26 is curved to extend with one end such as shown at 27 or 28 to be substantially tangent to the curved surface of the internal trough floor surface 22 in its upper position. Each curved scoop curves downwardly to extend at its other end 29 or 30 towards the axis of the pumping drum 20 and shaft 12. Considering the curved scoop duct 25 now being described in detail, it will be noticed that the one end 27 extends in a direction against the counterclockwise direction of rotation of the drum 20 and is therefore effective to scoop oil from the upper floor surface of the trough of the pumping drum when the drum and shaft are rotating in a counterclockwise direction. On the other hand, the scoop duct 26 which is to be effective for clockwise rotation of the pumping drum 20 and shaft 12 is curved to have its one end 28 extending against the direction of the clockwise rotation of the upper floor surface 22 of the trough of the pumping drum 20. Thus, if the scoop duct arrangement of the invention is intended to function for either direction of rotation of the shaft 12 and pumping drum 20, then both curved scoop ducts 25 and 26 would be provided although the invention is not limited to an arrangement having both ducts 25 and 26. The other end of each curved scoop duct 25 or 26 which is shown respectively at 29 and 30 is curved downwards to extend towards the axis of rotation of the pumping drum 20 and shaft 12.

As is more clearly shown by FIGS 1 and 3 of the drawings, the oil-distributing member 35 is provided with a surface curving at its upper end 36 to incline downwardly in the direction of the axis of rotation of the shaft 12 for distributing oil conveyed thereto by either of the scoop ducts 25 and 26 to the bearing distribution port 16. It is a particular feature of the invention that the mating surfaces at the respective ends 29 and 30 of the scoop ducts 25 and 26 are substantially tangent with the upper curved surface 36 of the oil-distributing member 31. Thus, oil that is scooped by the scoop duct 25 or 26 is deposited smoothly upon the oil-distributing member 31 and flows with a minimum of agitation and consequent aeration of the oil towards the oil-distributing port 16.

As more clearly shown by FIGS. 3 and 4 of the drawing each of the curved scoop members 25 and 26 is in the form having an inverted channel cross section which preferably is semicircular although other cross-sectional channel forms may be used. Also, the upper end of each curved scoop member such as the end 27 for the curved scoop duct 25 may be formed with a knife edge to provide a suitable scraping and shearing action for scooping the oil from the floor surface of the trough of the pumping drum 20 in its upper position.

As shown more clearly by FIG. 2 of the drawings, the oil-distributing member 31 is provided with sidewalls 40 and 41 and is of a width to substantially fill the space between the trough walls of the pumping drum area into which it extends. Thus, the width of the oil-distributing member 31 may be said to extend substantially from wall to wall near the top of the troughed rotatable oil-pumping drum 20. This is an advantageous feature considering that when shaft 12 is first starting to rotate and the pumping drum 20 consequently is not being rotated at a very high speed, oil carried by the floor 22 of the pumping trough may not cling to the floor for sufficient distance to be engaged by the scoop ends 27 and 28 of the curved scoop members 25 and 26. In such case however, the oil may drop from the floor of the pumping trough upon the floor of oil-distributing member 31 before reaching the scraping ends 27 and 28 of the scoop 25 and 26. Thus distribution of some lubricating oil would still be obtained even for low speed rotations of the shaft 12.

Various modifications will occur to those skilled in the art.

I claim as my invention:

1. In combination with a rotatable troughed oil-pumping drum for a self-lubricating bearing, the oil scoop duct arrangement comprising, an oil duct extending from within the drum to a bearing lubrication oil port, said duct having a first curved scoop member extending towards the top of the drum at one end in close proximity and substantially tangent to the internal floor of the troughed surface of the drum in a direction against the direction of rotation of the drum, said first scoop member curving downwards at its other end towards the axis of the drum, said duct further having an oil-distributing member with a surface curving from the other end of said first scoop member to incline towards the bearing in alignment with the axis of rotation of the drum to thereby scoop and distribute the oil from the drum to the bearing with a minimum of oil agitation and aeration, said curved scoop surface having an inverted channel shaped cross section with the base of the channel at its one end being closely adjacent the inner floor surface of the trough of the drum.

2. The invention of claim 1 wherein the mating surfaces at each end of the scoop duct are substantially tangent to the curved surfaces leading to and from.

3. The invention of claim 1 wherein the oil-distributing member has a width transverse to the axis of rotation of said drum sufficient to extend substantially from wall to wall near the top of the troughed drum.

4. The invention of claim 1 wherein the channel shaped cross section is semicircular.

5. The invention of claim 1 wherein said first scoop member is extending at its one end in a direction against a first direction of rotation of the drum and there is provided a second curved scoop member adjacent said first scoop member to extend at one end in close proximity to the upper internal trough floor surface of the drum in a direction against a second direction of rotation of the drum, said second scoop member curving downwards at its other end towards the axis of the drum adjacent the other end of said first scoop member to thereby enable pumping and distribution of oil by either direction of rotation of the drum.

6. The invention of claim 5 wherein the mating surfaces of the ends of said first and second scoop ducts and the oil-distributing member are substantially tangent to the curved surfaces leading to and from.

7. The invention of claim 5 wherein the first and second scoops have inverted channel shaped cross sections.

* * * * *